United States Patent [19]
Gempler

[11] 3,985,283
[45] Oct. 12, 1976

[54] METHOD OF JOINING BRAZE ALLOY TO A PARENT METAL PART

[75] Inventor: Edward B. Gempler, Findlay, Ohio

[73] Assignee: United Aircraft Products, Inc., Dayton, Ohio

[22] Filed: Aug. 1, 1974

[21] Appl. No.: 493,745

[52] U.S. Cl. .............................. 228/193; 228/194; 228/217; 228/254; 228/183
[51] Int. Cl.² ..................... B23K 19/00; B23K 1/04
[58] Field of Search .................. 29/493, 494, 497.5, 29/500, 501, 502; 228/193, 194, 195, 217, 253, 254, 183

[56] References Cited
UNITED STATES PATENTS

| | | | |
|---|---|---|---|
| 2,298,996 | 10/1942 | Woods | 29/502 X |
| 2,834,102 | 5/1958 | Pflumm et al. | 228/193 X |
| 3,133,346 | 5/1964 | Allen | 29/504 X |
| 3,370,343 | 2/1968 | Martin | 228/206 |
| 3,384,951 | 5/1968 | Binger | 29/502 X |
| 3,550,254 | 12/1970 | Greenspan et al. | 29/493 |
| 3,581,382 | 6/1971 | Wells et al. | 29/502 X |
| 3,673,678 | 7/1972 | Moreau et al. | 228/219 |

FOREIGN PATENTS OR APPLICATIONS
692,778  8/1964  Canada ............................. 228/194

OTHER PUBLICATIONS
Welding Handbook, edited by Len Griffing, 6th ed., vol. 4, pp. 69, 137 Miami, Fla., American Welding Society; 1972.

Primary Examiner—Al Lawrence Smith
Assistant Examiner—K. J. Ramsey
Attorney, Agent, or Firm—J. E. Beringer

[57] ABSTRACT

A method including the step of applying braze alloy in sheet-like form to a part made of a brazeable parent metal. Pressure is exerted to place the braze alloy in intimately contacting relation to the part. For a predetermined period of time, while the exerted pressure is maintained, heat is applied at a temperature value which is just below the melting point of the braze alloy. Diffusion bonding occurs and, in accordance with an optional practice of the invention, a catalyst may be introduced which at a temperature below the applied temperature liquifies and speeds up the diffusion process.

17 Claims, 4 Drawing Figures

U.S. Patent   Oct. 12, 1976   3,985,283
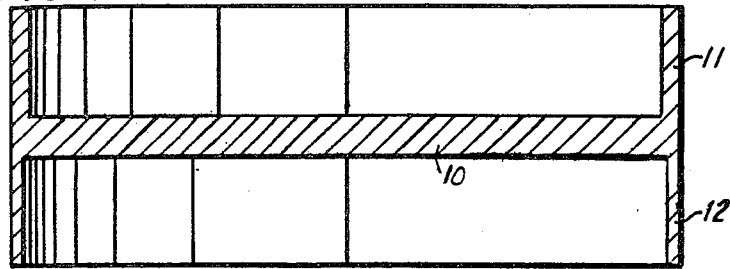
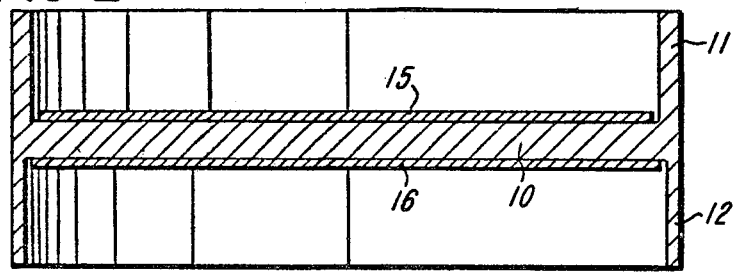
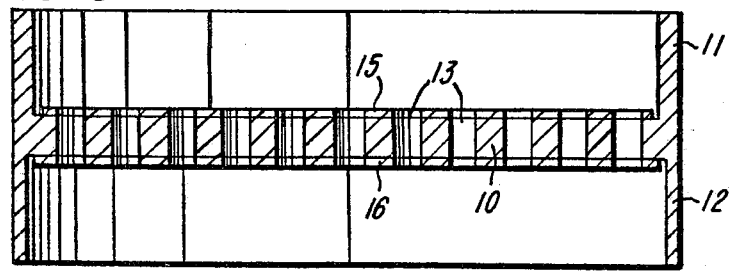
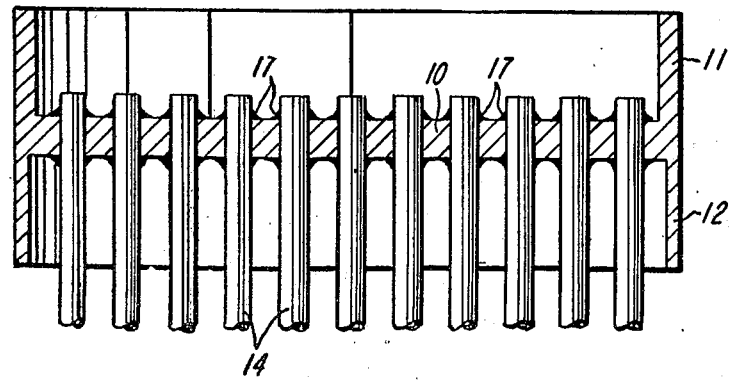

METHOD OF JOINING BRAZE ALLOY TO A PARENT METAL PART

BACKGROUND OF THE INVENTION

This invention relates to the preparation of brazeable metals for brazing and in particular to the joining of braze alloy to parts to be brazed. It is known to supply brazeable parts having a coating or cladding of a braze alloy. A characteristic of the cladding alloy is that it will melt at a temperature lower than the melting temperature of the parent material. In the brazing process it flows to form a coherent joint between the clad part and adjoining parts at a temperature which approaches but is still less than the melting temperature of the parent material. The term "brazing sheet" is frequently used to describe pre-made parts comprising a base sheet of a parent metal, either one or both sides of which is overlaid by a cladding of braze alloy. Purchased braze sheet may be cut, sized and otherwise machined prior to being assembled with other parts and united therewith in a brazing process.

The cladding or braze alloy is itself produced in a solid, sheet-like form. In one method of fabrication of brazing sheet, a sheet of brazing alloy is super-imposed on a base sheet of a parent metal, either to one or both sides thereof, with the assembly so formed being then subjected to a roll bond or like operation in which the overlying alloy sheet is made mechanically to adhere to the underlying base sheet. This, and similar joining techniques, has the disadvantage of being inapplicable to irregularly shaped parts which cannot be conventionally clad and then bent to a desired configuration. Moreover, brazing sheet normally is made with standard thicknesses of brazing alloy, with an absence of close dimensional tolerance as may be desirable for subsequent machining and fixturing.

A problem of brazing irregularly shaped parts can be dealt with to a limited extent by applying the braze alloy as a poured molten metal, as a compacted powder and as a foil. All have certain disadvantages which become particularly apparent when a part is required to be machined prior to brazing. In the making of header plates for tubular heat exchangers, for example, the plates are required to be drilled so that tubes may be installed, and, in a subsequent brazing operation, unitarily joined to the plate. Flat recessed surfaces of the plate become reference surfaces for drilling operations. Poured molten metal on recessed surfaces makes them rough and uneven and therefore unsuitable as reference surfaces. Compacted powders, even though sintered, are relatively porous. They absorb lubricants during the drilling process with the result that the making of a sound, uniform bond between the sintered braze alloy and parent metal is inhibited. Application of the braze alloy in a foil form has aspects of practicality but to avoid the problem of joint contamination by drilling lubricants, and to insure accurate drilling, it is necessary separately to drill the foil and the header plate and then to superimpose the foil on the plate so that drilled holes align with one another. This is a relatively costly assembly process, however, and the obtaining of precise alignment of drilled holes may be difficult.

SUMMARY OF THE INVENTION

The instant invention offers a generally new method of joining braze alloy to parent metal in a base sheet. In such method, a sheet of braze alloy, cut to fit in and around surface irregularities in the base sheet, is superimposed on the base sheet. There it is weighted or otherwise made subject to compressive forces by which a close intimately contacting relation of the braze alloy to the overlaid base sheet is achieved. While the brazing sheet components are so held, the assembly is heated, a relatively elevated temperature being established which is less than the melting point of the parent metal and just under the melting point of the braze alloy. In a period of time over which these conditions are maintained, solid state diffusion of elements of the braze alloy into the material of the parent metal occurs as a result of which thorough bonding of the braze alloy to the base sheet takes place. The heating step advantageously is performed in a furnace where temperatures can be closely controlled. Further, in a vacuum furnace the formation of oxides inhibiting to the achievement of a sound joint can be substantially limited or eliminated. A base sheet to which a unitary layer of braze alloy has been applied is ready for machining, in the course of which clad surfaces can be used as reference surfaces.

While having particular utility as a means of joining braze alloy to parts of irregular shape, the invention method improves upon and broadens the braze sheet concept. It allows cladding to be applied to close dimensions and to any desired thickness. It insures an excellent bond at the cladding interface so that machine lubricants, dirt and foreign compounds will not be entrapped. It provides a practicable means of preparing a part for brazing when brazing sheet is unavailable or where machining or other requirements make it unsuitable for use.

The invention method, in relation to machined, brazeable parts, simplifies and improves upon all of the machining, assembly and brazing steps. In machining, it allows an irregularly shaped part to be clad with a braze alloy while still retaining a flat reference surface and avoiding porosity which would lead to joint contamination. As compared to foil use, it halves required drilling operations.

In assembly, the number and complexity of required steps are reduced, with no problems of precision alignment arising.

In brazing, the invention method allows the application of any thickness braze alloy to either one or both sides of a part. It provides an intimate bond between the braze alloy and parent metal, obviating the need for this to be accomplished simultaneously with the braze operation, as is necessary in the foil method.

In an optionally included step, the invention contemplates use of a catalyst, the presence of which speeds up the diffusion process. This step may take the form of introducing into the furnace, along with a held base sheet and braze alloy combination a material melting at a temperature below the established or operating temperature. Small pockets of liquid at the interface bring about some liquid state diffusion reducing the time required for complete bonding.

An object of the invention is to provide a method of joining a braze alloy to a parent metal characterized substantially as in the foregoing.

Other objects and structural details of the invention will more clearly appear from the following description when read in conjunction with the accompanying drawings, wherein:

FIG. 1 is a view in cross section of an irregularly shaped part, prior to application of the braze alloy;

FIG. 2 is a view like FIG. 1, with braze alloy applied but prior to bonding and machining;

FIG. 3 is a view like FIG. 2, after bonding and after machining preparatory to brazing; and FIG. 4 is a view like FIG. 3, after brazing of the parts to other adjoining parts.

For illustrative purposes, the invention is disclosed in connection with application of braze alloy to a heat exchanger header plate, made irregular in shape by the presence of a T configuration at its periphery. A part so configured does not lend itself to application of braze alloy by conventional means. Using foil, powdered metal and compacted powder are possible but are unsatisfactory for one or more of the reasons discussed. Brazing sheet of a thickness corresponding to the maximum thickness of the header plate could conceivably be made available. The subsequent machining of such a sheet to obtain the recessed shape shown would, however, remove the braze alloy.

A brazeable part in accordance with the present invention is a header plate 10, the periphery of which is effectively flanged to provide oppositely projecting cylindrical portions 11 and 12. These have shell and manifold attaching functions in a tubular heat exchanger, which it is unnecessary here to consider, and may, as shown, have differential thicknesses. They place plate 10 in a relatively recessed relation. The latter is at a step prior to brazing of the core of the heat exchanger machined to provide a plurality of through holes 13 to receive tubes 14.

In preparing part 10 for the assembly and brazing process, it has superimposed thereon sheets of brazing alloy 15 and 16 cut and sized to be received relatively nicely within respective projecting cylindrical portions 11 and 12. Desirably, both part 10 and braze alloy sheet 15 and 16 are thoroughly cleaned prior to assembly. Cleaned and assembled parts then are subjected to pressure in that compressive forces are applied in a direction to urge the braze alloy sheet into close intimately contacting relation to respective surfaces of part 10. While such forces continue to be applied, the assembly is subjected to heat, a temperature being attained and held for a determined interval which is just below the melting point or melting temperature of the braze alloy. In response to the combined effects of pressure, and of temperature at the value indicated, solid state diffusion occurs in which elements of the braze alloy are received in the parent metal of the part. Upon cooling and release of the applied pressure, the part 10 is found to have its upper and lower surfaces clad with a braze alloy positively united with the parent material of the part.

Drilling of the holes 13 follows, with brazed materials 15 or 16, or both, being used as reference surfaces. After drilling, tubes 14 are installed in the formed holes, opposite ends of the tubes interengaging with other header means which may be another part 10. The tube and header assembly, which may be regarded as forming the core of a heat exchanger, is then "brazed" in a process including the step of subjecting the assembly to an elevated temperature sufficient to melt the braze alloy but not so high as to melt the material of part 10 or the material of tube 14. The result is to cause the braze alloy to flow, with liquid diffusion taking place, and fillets 17 forming about the tubes at locations at and adjacent to part 10. Upon the assembly being allowed to cool, the tubes are found positively to be joined to the header by means constituting a seal and a bond.

The method of joining braze alloy to parent metal parts is applicable to a variety of metals and braze alloys. A particular, although not limited, application of the invention is in the fabrication of aluminum heat exchangers where extensive use is made of brazing as a joining and sealing technique in connection with the heat exchanger core. Thus, the header part 10 may be regarded as being made of aluminum, for example to the designation 6061. It is thus composed in the main of substantially pure aluminum with minor amounts of other metals, and has a melting temperature in the range of 1100° F. to 1205° F. Similarly, sheets 15 and 16 of braze alloy may be regarded as being made also of aluminum, for example to the designation 718. The braze alloy is thus composed in the main of substantially pure aluminum with somewhat more significant amounts of other metals and has a melting temperature in the range of 1070° F. to 1080° F.

Applying of compressive forces to the braze alloy sheet may be accomplished in selected ways and will ordinarily vary with the means used to subject the assembly to elevated temperature. A vacuum furnace, when available, offers a preferred means of heating in view of its simplicity, uniformity of applied heat, ready controllability and the lesser opportunity afforded for oxides to form at the interface between the braze sheets and the parent metal part. In a practice of the invention, using materials as above mentioned and heating in a vacuum furnace, the header part and applied braze alloy sheets are mounted in a fixture and weights applied exerting a compression force across the header on the order of 0.75 PSI minimum. The pressure is applied substantially uniformly across both sheets 15 and 16. The fixtured assembly is placed in a vacuum furnace evacuated to a negative value on the order of 1.5 to 2.0 $\times 10^{-4}$ Torr, or better. The temperature in the furnace is then raised to a value on the order of 1060° F. to 1065° F. and held for a period of time on the order of 7 to 8 minutes or longer. This is a temperature under the melting temperature of the parent metal of the header and which approaches but is just under the melting temperature of the braze alloy. Favorable conditions accordingly are established for an excellent diffusion bonding of the braze alloy with the parent metal part, and, upon shutting down of the furnace and removal of the assembly, this will be found to have occurred.

The time at temperature in the joining process can be reduced by introducing a catalyst to increase the speed of diffusion at the interface between the braze alloy and the parent metal part. According to this method step, if used, there is introduced into the diffusion bonding environment a means melting at a temperature lower than the operating temperature established within the furnace. Thus, assuming an operating temperature of 1060° F. to 1065° F., as in the above discussed example, a catalyst is selected melting at a temperature equaling or lower than 1060° F. The catalyst may be incorporated directly into the braze alloy as a constituent thereof, or, as fragments or chips, may be placed in the furnace along with the materials to be joined. In either event, the result is to create small pockets of liquid at the interface, using a limited amount of liquid diffusion to accelerate the bonding process. Very small areas of the interface are affected, the bulk of the braze alloy remaining in a solid state.

Thus, while the method of the invention can be practiced without a catalyst or accelerating agent, the use of such a means does form a contemplated aspect of the invention. Bearing in mind the exemplary method before described, a useful catalyst may be magnesium, forming a Mg-Si-Al ternary eutectic that melts at a temperature of about 1030° F. Other catalysts may be preferred, especially in joining materials other than the exemplary aluminum material, and, as noted, the invention does not depend for utility on the use of any catalyst. Pressure to give intimate contact, and heat to initiate diffusion are all that is required.

The present process is essentially that of solid state diffusion. Addition of a catalyst provides a two-phase condition in which both liquid and solid state diffusion take place. The catalyst, at a sufficiently high temperature, volatilizes with the vapor being released to the furnace atmosphere. Penetrating minute voids and migrating by diffusion, the vapor is made to be present in small quantities at the interface between the braze alloy and parent metal and to wet the interface.

The drawings show in FIG. 2 a header plate — braze alloy assembly before joining of the parts. FIG. 3 shows the same assembly after completion of the joining process, and after machining, indicating a diffusion of braze alloy into the parent metal. In the illustrative example, braze alloy is applied to both exposed surfaces of the part 10. It can be applied, of course, to one side only of a part if not needed on the opposite side. If the surface of the part is interrupted with plural irregularities, it will be understood that sheets of braze alloy will be appropriately formed or cut to plural piece form to nest within the parent part.

What is claimed is:

1. A method of joining braze alloy to at least selected surfaces of a rigid irregularly shaped part later to be united with other parts in a brazing process, said part being comprised of a brazeable parent metal, including the steps of superimposing braze alloy in solid form on said selected surfaces of said part as a cladding using applied external pressure to obtain an intimately contacting relation of said cladding with said part, and in an interval during which said applied pressure is maintained subjecting the assembly comprising said part and said cladding to an elevated temperature which is below the melting point of the parent material of said part and which approaches but is less than the melting point of the braze alloy to join the braze alloy to said part while retaining its individual character as a cladding.

2. A method according to claim 1, wherein said braze alloy has a sheet-like form and is cut and sized precisely to fit contours of said part.

3. A method according to claim 1, wherein pressure and elevated temperature are applied for a time sufficient to effect solid state diffusion of constituents in the braze alloy into the parent metal of said part at the interface therebetween.

4. A method according to claim 3, wherein the applied temperature has a value just below the temperature value at which said braze alloy melts.

5. A method according to claim 4, wherein said part is made of an aluminous material melting in a temperature range on the order of 1100°–1200° F. and said braze alloy is made of an aluminous material melting in a temperature range on the order of 1070° F. to 1080° F., the temperature to which said assembly comprising said part and said cladding is subjected being in the range of 1060° F. to 1065° F.

6. A method according to claim 5, wherein pressure applied to said assembly to obtain initimate contact of said braze alloy with said part is on the order of 0.75 psi minimum.

7. A method according to claim 5, wherein said assembly is heated under conditions of reduced atmospheric pressure for a period of time on the order of 7 to 8 minutes.

8. A method according to claim 7, wherein said assembly is heated under an applied vacuum on the order of 1.5 to 2.0 × $10^{-4}$ torr or better maintained during said period of time.

9. A method according to claim 5, wherein said assembly is heated in a vacuum furnace, characterized by the step of adding to the furnace metallic means having a melting temperature on the order of 1030° F. and in liquid form speeding up the diffusion process at said interface.

10. A method according to claim 3, characterized by the step of introducing a catalyst which melts at a temperature lower than said elevated temperature to speed up the diffusion process by forming pockets of liquid at said interface.

11. A method according to claim 3, wherein said part is heated in an enclosed environment, characterized by the step of introducing into said environment a material vaporizable at a temperature below said elevated temperature to wet the interface between the braze alloy and the parent metal to utilize limited liquid diffusion in conjunction with solid state diffusion to reduce the time-at-temperature at which said part is required to be held.

12. A method according to claim 11, wherein said introduced material at said lower temperature releases vapor into said environment to penetrate minute voids and to migrate by diffusion to appear in small quantities at the interface between the braze alloy and the parent metal of the part.

13. A method according to claim 12, wherein said irregularly shaped part is composed in the main of substantially pure aluminum with minor amounts of other metals and melts at a temperature in the range of 1100° F. to 1204° F., said braze alloy being comprised in the main of substantially pure aluminum with somewhat more significant amounts of other metals and melting at a temperature in the range of 1070° F. to 1080° F., said vaporizable material being magnesium and melting at a temperature of about 1030° F., the method subjecting said part to a rising temperature held at a high level to a value in the range of 1060° F. to 1065° F.

14. A method according to claim 13, wherein said magnesium is introduced as a constituent of said braze alloy.

15. A method according to claim 13, wherein said enclosed environment is provided by a vacuum furnace, said magnesium being introduced therein in the form of chips external to said part.

16. A method of preparing a header plate for the brazing of tubes thereto, said plate being irregularly configured, including the steps of superimposing on at least one of oppositely presented faces of said plate braze alloy in sheet form, said braze alloy having a melting point which is lower than that of the material of said header plate, placing the header plate with superimposing braze alloy in a furnace while using applied external pressure to obtain an intimately contacting relation of said braze alloy with said header plate, while maintaining said applied pressure raising the temperature in said furnace to a value which is below the melting temperature of the material of said header plate and which approaches but is less than the melting temperature of said braze alloy and holding the temperature at said value for a selected interval during which said braze alloy is joined to said header plate as a cladding thereon, removing the header plate from the furnace, and drilling tube accommodating holes through said plate and through the braze alloy cladding thereon.

17. A method according to claim 16, characterized by the step of introducing into the environment of said furnace a material vaporizable therein in the course of raising the furnace temperature and which in having access in vapor form to the interface between said braze alloy and said header plate and wetting said interface brings about a two-phase condition in which both solid and liquid diffusion takes place at said interface.

* * * * *